United States Patent [19]

Antika et al.

[11] Patent Number: 5,391,313
[45] Date of Patent: Feb. 21, 1995

[54] REFRIGERATION WORKING FLUID CONTAINING COMPLEX ESTER AND TETRAFLUOROETHANE

[75] Inventors: Shlomo Antika, Maplewood; Thomas G. Dietz, Millington, both of N.J.; Richard H. Schlosberg, Baton Rouge, La.; David W. Turner, Houston, Tex.; George A. Weisgerber, Cranford, N.J.

[73] Assignee: Exxon Research and Engineering Company, Florham Park, N.J.

[21] Appl. No.: 42,031

[22] Filed: Apr. 2, 1993

Related U.S. Application Data

[63] Continuation-in-part of Ser. No. 811,448, Dec. 19, 1991, abandoned.

[51] Int. Cl.$^6$ .................... C10M 105/18; C09K 5/00
[52] U.S. Cl. .................... 252/68; 252/56 R; 252/56 S; 252/54
[58] Field of Search .................... 252/68, 56 R, 56 S, 252/54

[56] References Cited

U.S. PATENT DOCUMENTS

| | | | |
|---|---|---|---|
| 4,497,721 | 2/1985 | Katayama | 252/56 R |
| 4,585,565 | 4/1986 | Tsai | 252/49.5 |
| 4,786,427 | 11/1988 | Dare-Edwards | 252/56 R |
| 4,900,463 | 2/1990 | Thomas et al. | 252/54 |
| 5,114,605 | 5/1992 | Mizui et al. | 252/68 |
| 5,185,092 | 2/1993 | Fukuda et al. | 252/56 S |
| 5,238,590 | 8/1993 | Mizui et al. | 252/52 A |

FOREIGN PATENT DOCUMENTS

| | | |
|---|---|---|
| 435253 | 7/1991 | European Pat. Off. |
| 461262 | 12/1991 | European Pat. Off. |
| 470788 | 2/1992 | European Pat. Off. |
| 33192 | 2/1991 | Japan |
| 221594 | 9/1991 | Japan |
| 198394 | 7/1992 | Japan |

*Primary Examiner*—Stephen Kalafut
*Assistant Examiner*—James M. Silbermann
*Attorney, Agent, or Firm*—John W. Ditsler; James H. Takemoto

[57] ABSTRACT

A refrigerator working fluid which comprises
(a) tetrafluoroethane, and
(b) a synthetic ester lubricant with a viscosity of about 150 cSt or less at 40° C. and having the formula $(R_1-R_2)_n R_3$
wherein $R_1$ is $$R_6-\underset{\underset{R_7}{|}}{\overset{\overset{R_5}{|}}{C}}-\overset{\overset{O}{\|}}{C}-O$$

in which $R_5$, $R_6$ and $R_7$ are each independently hydrocarbyl group of from 1 to 7 carbon atoms with the proviso that the sum of carbon atoms in $R_5+R_6+R_7$ is from 3 to 9,
$R_2$ is selected from the group consisting of $(CH_2-CH_2-O-)_{b'}$ $$(CH_2-\underset{\underset{CH_3}{|}}{CH}-O-)_{b'}$$

and mixtures thereof, where b is an integer from 1 to 3,
$R_3$ is a monobasic or polybasic carboxylic acid radical of the formula $$R_4(\overset{\overset{O}{\|}}{C}-)_n$$

where $R_4$ is a hydrocarbyl group having m carbon atoms where m is an integer from 1 to 9, and n is an integer from 1 to 4.

6 Claims, No Drawings

REFRIGERATION WORKING FLUID CONTAINING COMPLEX ESTER AND TETRAFLUOROETHANE

CROSS REFERENCE TO RELATED APPLICATION

This application is a continuation-in-part of U.S. Ser. No. 811,448, filed Dec. 19, 1991, now abandoned.

BACKGROUND OF THE INVENTION

1. Field of the Invention

This invention concerns a refrigeration working fluid comprising a fluorocarbon refrigerant and certain complex ester lubricants that are miscible with the refrigerant.

2. Description of Related Art

It is recognized that currently used refrigeration working fluids which contain chlorine, such as dichlorodifluoromethane, will be replaced by chlorine-free refrigerant fluids because of the adverse effect of the chlorinated materials upon the atmospheric ozone layer. Tetrafluoroethane isomers and in particular "Refrigerant 134a", which is 1,1,1,2-tetrafluoroethane, are now considered desirable fluids for use in refrigeration systems.

Refrigerant working fluids are required to have a lubricant which is compatible and miscible with the refrigerant fluids. Heretofore, such lubricants have been composed of hydrocarbon mineral oils which are miscible with the chlorine-containing refrigerant fluids and which provide effective lubrication.

The use of tetrafluoroethane refrigerant fluids has created a need for new lubricants, since mineral oils are not compatible with these materials. This need is well recognized in the art and there are numerous recent publications and patents disclosing various types of synthetic lubricants which are said to be compatible with tetrafluoroethane refrigerant fluids. Esters of polyols are being particularly emphasized as being suitable for use with the tetrafluoroethane refrigerants, especially Refrigerant 134a (R134a).

U.S. Pat. No. 5,021,179, issued Jun. 4, 1991, to Zehler et al., discloses esters of polyols in which the acyl groups have at least 22% of (a) branched acyl groups or (b) acyl groups which contain no more than six carbon atoms. This patent also indicates that the esters have a certain ratio of the number percent of acyl groups that have 8 or more carbon atoms and are unbranched to the number percent of acyl groups that are branched and contain not more than 6 carbon atoms and that this ratio is not greater than 1.56. Also, the patent requires that the number percent of acyl groups having at least 9 carbon atoms, branched or not branched, will be not greater than 81.

PCT Application WO 90/12849 published Nov. 1, 1990, by Jolley et al. discloses generally liquid compositions containing a major amount of at least one fluorine containing hydrocarbon containing one or two carbon atoms and a minor amount of at least one soluble organic lubricant comprising at least one carboxylic ester of a polyhydroxy compound containing at least two hydroxy groups and having the formula $R[OC(O)R']_n$ where R is hydrocarbyl, each R' is independently hydrogen, straight chain lower hydrocarbyl, a branched chain hydrocarbyl group, or a straight chain hydrocarbyl group containing from 8 to about 22 carbon atoms, provided that at least one R' group is hydrogen, a lower straight chain hydrocarbyl or a branched chain hydrocarbyl group, or a carboxylic acid-containing or carboxylic acid ester-containing hydrocarbyl group, and n is at least 2.

U.K. Patent 2,216,541, issued Oct. 23, 1991, to Imperial Chemical Industries discloses the use of any ester of molecular weight 250 or greater as being suitable for use as compatible lubricants with Refrigerant 134a and some related refrigerant fluids. The patent exemplifies adipates, pyromellitates, and benzoates.

European Published Patent Application 440069 published Aug. 7, 1991, by Kao Corporation discloses refrigeration working fluids composed of fluoroethanes and esters prepared by reacting an aliphatic polyol and a straight or branched chain alcohol with an aliphatic polycarboxylic acid having 2 to 10 carbon atoms.

European Published Application 415778 published Mar. 6, 1991, by Kao Corporation discloses a refrigeration working fluid composition containing hydrogenated fluoroethane and an ester compound obtained from an aliphatic polyhydric alcohol, a saturated aliphatic dicarboxylic acid, and a saturated aliphatic monocarboxylic acid.

European Published Application 406479 published Jan. 9, 1991, by Kyodo Oil Technical Research Center Co., Ltd., discloses lubricants which are said to be compatible with R134a. Suitable lubricants are: esters of neopentyl glycol and a straight or branched-chain monovalent fatty acid having 3–18 carbon atoms; esters of pentaerythritol, dipentaerythritol, and tripentaerythritol with straight or branched chain $C_2$–$C_{18}$ monovalent fatty acids; esters of a trihydroxy polyvalent alcohol of the formula $RC(CH_2OH)_3$ where R is $C_1$–$C_3$ alkyl with a straight or branched-chain monovalent fatty acid having 2–18 carbon atoms and not more than 25 mol % per total fatty acid of at least one polybasic acid having carbon number of 4–36.

European Published Application 435253 published Jul. 3, 1991, by Nippon Oil Co., Ltd. discloses a number of esters said to be compatible with R134a, the esters being defined as having specific structures and being esters of mono-, di- and tri- pentaerythritol and other polyols such as trimethylolethane, trimethylolpropane, trimethylolbutane, or dimers or trimers thereof with monocarboxylic acids having 2–15 carbon atoms and dicarboxylic acids having 2–10 carbon atoms. The esters are generally said to have molecular weights of about 200–3000.

European Published Application 430657 published Jun. 5, 1991, by Ashai Denka Kogyo Kabushiki discloses lubricants compatible with R134a which are characterized as being neopentyl polyol ester of a fatty acid having 2 to 6 carbon atoms. It is said in this publication that the use of acids having 7 or more carbon atoms will result in incompatibility if the amount of $C_2$–$C_6$ acids is not 20 mol % or greater such that the average number of carbon atoms of the fatty acids per hydroxyl group of the neopentylpolyol is 6 or below. Suitable neopentyl polyols include mono-, di- and tripentaerythritol, trimethylolpropane, and trimethanolethane. The polyols must have at least three OH groups.

Other references dealing with the problem of R134a lubricant compatibility are U.S. Pat. No. 4,851,144, issued Jul. 25, 1989, to McGraw et al. (which discloses mixtures of polyether polyols and esters as lubricants) and U.S. Pat. No. 4,755,376 issued Jul. 5, 1988, to Magid et al. (which discloses polyether glycols are lubricants for tetrafluoroethane working fluids).

The prior art summarized above presents a conflicting picture of which lubricants are suitable for use with tetrafluoroethane refrigerants, particularly R134a. However, none of this prior art discloses the particular parameters required for a complex ester lubricant to have suitable miscibility and excellent thermal stability and lubricating properties with tetrafluoroethane refrigerants.

SUMMARY OF THE INVENTION

This invention concerns a refrigeration working fluid comprising
(a) tetrafluoroethane, and
(b) a synthetic ester lubricant with a viscosity of about 150 cSt or less at 40° C. and having the formula $(R_1-R_2)_n R_3$
wherein $R_1$ is

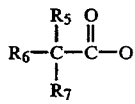

in which $R_5$, $R_6$ and $R_7$ are each independently hydrocarbyl group of from 1 to 7 carbon atoms with the proviso that the sum of carbon atoms in $R_5+R_6+R_7$ is from 3 to 9, $R_2$ is selected from the group consisting of $(CH_2-CH_2-O-)_b$,

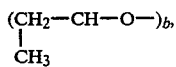

and mixtures thereof, where b is an integer from 1 to 3, $R_3$ is a monobasic or polybasic carboxylic acid radical of the formula

where $R_4$ is a hydrocarbyl group having m carbon atoms where m is an integer from 1 to 9, and n is an integer from 1 to 4.

DETAILED DESCRIPTION OF THE INVENTION

The working fluid of this invention requires tetrafluoroethane refrigerant and a synthetic ester lubricant.

The tetrafluoroethane refrigerant used in this invention is 1,1,2,2-tetrafluoroethane (R134), 1,1,1,2-tetrafluoroethane (R134a), or mixtures thereof. R134a is the preferred tetrafluoroethane refrigerant.

The synthetic ester lubricant used in this invention has the formula $(R_1-R_2)_n R_3$ where $R_1$, $R_2$, $R_3$, and n are defined as above.

The $R_1$ radicals are derived from branched chain alkanoic acids having the formula

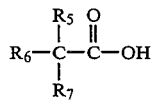

where $R_5$, $R_6$ and $R_7$ are hydrocarbyl groups as defined above. The hydrocarbyl groups include aliphatic (alkyl or alkenyl) or alicyclic groups, preferably alkyl groups. The sum of carbon atoms in $R_5+R_6+R_7$ is preferably from 5 to 8, especially 7 to 8. Examples of branched chain carboxylic acids include

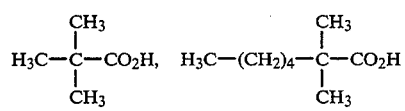

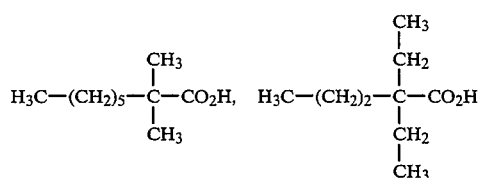

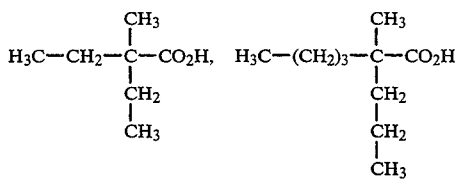

Such branched chain carboxylic are also known as neoacids and are available commercially from Exxon Chemical Company. Preferred neoacids include neodecanoic acid, neomonanoic acid, neooctanoic acid, neoheptanoic acid, neopentanoic acid and mixtures thereof.

$R_2$ is preferably the oligo ethoxy group $(CH_2-CH_2-O-)_b$. Most preferably, b in $R_2$ is 1. However, $R_2$ is usually a mixture in which b ranges from 1-2, with compounds having b=1 comprising a major portion, preferably 95% or more, of $R_2$. There may also be present trace amounts of b equal to 3 or more.

Suitable monobasic or polybasic carboxylic acid radicals having the formula

are derived from monobasic, dibasic, tribasic, and tetrabasic carboxyl acids. The hydrocarbyl groups comprising $R_4$ include aliphatic (alkyl or alkenyl), alicyclic or aryl groups. Examples of monobasic acids are neoacids defined by $R_1$ and benzoic acid. Examples of dibasic acids include adipic, fumaric, glutaric, isophthalic, maleic, malonic, oxalic, phthalic, pimelic, sebacic, suberic, succinic, and terephthalic acids. Examples of tribasic acids include propane tricarboxylic, butane tricarboxylic, pentane tricarboxylic, hexanetricarboxylic, and trimellitic acids. Examples of tetrabasic acids include butane tetracarboxylic and pyromellitic acids. Dibasic acids are preferred, particularly adipic, isophthalic, phthalic, sebacic, and terephthalic acids, with adipic and sebacic acids being most preferred. Preferably, n ranges from 1 to 2.

To ensure miscibility with the refrigerant, the synthetic ester lubricant should have a viscosity of 150 cSt or less, preferably 140 cSt or less, most preferably 120 cSt or less, at 40° C. and the number of carbon atoms in $R_4$ (m) should be 9 or less. In practice, the lubricant will have a viscosity ranging from about 15 to about 150, most preferably from about 15 to about 120 cSt at 40° C. Preferably, m should range from 4 to 6.

In general, the synthetic ester lubricant used in this invention can be prepared by reacting a neoacid with an ether to form an alcohol, which is then reacted with a mono or multibasic acid to form the ester lubricant. As an example, a neoacid such as neononanoic acid is reacted with an ether such as ethylene oxide or propylene oxide in the presence of a catalyst such as ammonium carbonate or triethanolamine. Typical reaction conditions are a temperature between about 140° and about 170° C. and a pressure between about 40 and about 80 psig. The alcohol thus formed is then reacted with a mono or multibasic acid such as adipic acid in the presence of a suitable esterification catalyst to form the ester. Suitable esterification catalysts are sulfuric acid, para toluene sulfonic acid, and titanium tetraalkoxides such as isopropyl titanate (see U.S. Pat. No. 3,818,071, the disclosure of which is incorporated herein by reference).

The preparative reaction scheme is illustrated as follows using a single isomer of neononanoic acid. Commercial neononanoic acid is a mixture of isomers.

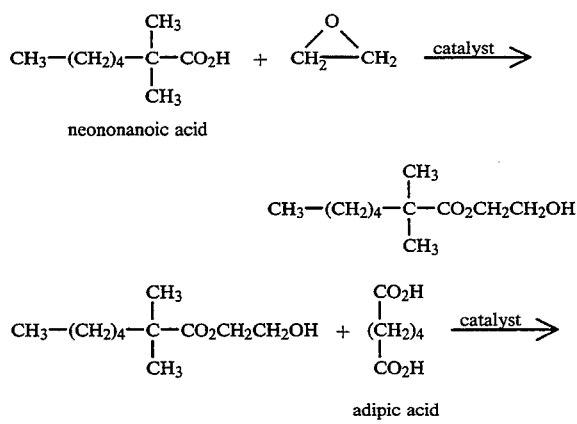

neononanoic acid adipic acid

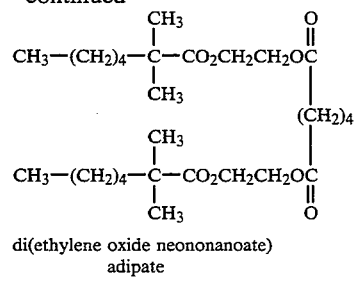

di(ethylene oxide neononanoate) adipate

The relative amount of synthetic ester lubricant and refrigerant in the working fluid of this invention can vary broadly provided the lubricant is miscible with the refrigerant. Typically, however, the working fluid will comprise from about 5 to about 55 wt. % lubricant and from about 95 to about 45 wt. % refrigerant.

If desired, conventional lubricant additives such as antiwear agents, antioxidants, extreme-pressure agents, corrosion inhibitors, defoaming agents, metal deactivators, viscosity improvers, and the like can be added to the synthetic ester lubricant. Typically, up to about 8 wt. % of such additives will be present in the lubricant.

This invention will be better understood by reference to the following example, which includes a preferred embodiment of this invention.

Example—Miscibility of Various Lubricants with R134a Refrigerant

The miscibility of various mixtures of several lubricants with R134a refrigerant was determined in the following manner. A measured quantity of ester lubricant is poured into a valved glass tube of 12 mm I.D. The tube is connected to a R134a refrigerant charging unit, where air is evacuated and a set volume of refrigerant is condensed into the glass tube until a desired refrigerant gas pressure drop is obtained. The composition of the lubricant/refrigerant mixture is calculated from weight measurements taken of the tube, tube plus lubricant, and tube plus lubricant plus refrigerant. The tube containing the lubricant/refrigerant is visually observed for miscibility at room temperature, in a high temperature visibility bath where the temperature is thermostatically controlled up to +60° C., and in a low temperature visibility bath where the temperature is thermostatically controlled down to −60° C. The mixture is considered miscible to a given temperature if none of the following conditions is observed: cloudiness, formation of floc or precipitate, separation into two liquid layers. The mixture is considered immiscible if any of these conditions is observed.

The results of these tests are shown in Table 1.

TABLE 1

| Lubricant | Viscosity cSt @ 40° C. | x + y + z | b(l) | m | n | Miscibility at Temperature Range −60° C. to +60° C. | |
|---|---|---|---|---|---|---|---|
| | | | | | | Wt R134a/Wt of oil | Miscible |
| Di(isotridecyl)adipate | 26.6 | — | — | 4 | 2 | 6.6 | No |
| | | — | — | 4 | 2 | 2.9 | No |
| | | — | — | 4 | 2 | 1.0 | No |
| Di(ethylene oxide neononanoate) adipate | 33.7 | 7 | 1 | 4 | 2 | 8.7 | Yes |
| | | 7 | 1 | 4 | 2 | 2.4 | Yes |
| | | 7 | 1 | 4 | 2 | 0.9 | Yes |
| | | 7 | 1 | 4 | 2 | 0.4 | Yes |
| | | 7 | 1 | 4 | 2 | 0.1 | Yes |
| Di(ethylene oxide neodecanoate) adipate | 40.2 | 8 | 1 | 4 | 2 | 8.8 | Yes |
| | | 8 | 1 | 4 | 2 | 3.2 | Yes |
| | | 8 | 1 | 4 | 2 | 1.0 | Yes |
| Ethylene oxide neononanoate | 11.42 | 7 | 1 | 6 | 1 | 8.8 | Yes |

TABLE 1-continued

| Lubricant | Viscosity cSt @ 40° C. | x + y + z | b(1) | m | n | Miscibility at Temperature Range −60° C. to +60° C. | |
|---|---|---|---|---|---|---|---|
| | | | | | | Wt R134a/Wt of oil | Miscible |
| benzoate | | 7 | 1 | 6 | 1 | 0.6 | Yes |
| Di(ethylene oxide neononan-oate)terephthalate | 156.9 | 7 | 1 | 6 | 2 | 22.6 | Between 18° and +60° C. |
| | | 7 | 1 | 6 | 2 | 8.9 | Between −8° and +60° C. |
| | | 7 | 1 | 6 | 2 | 3.0 | No |
| Di(ethylene oxide neononanoate) trimellitate | 1964.8 | 7 | 1 | 6 | 3 | 8.8 | No |
| Di(ethylene oxide neodecanoate) dodecanedioate | 56.7 | 7 | 1 | 10 | 2 | 7.0 | No |

(1) Typically, b is 1 in more than 95% and 2 in less than 5% of the lubricant. Only trace amounts of b being 3 or more are present.

The data in Table 1 show that the synthetic ester lubricants of this invention are miscible with tetrafluoroethane refrigerants at a temperature between −60° and +60° C. provided the viscosity of the lubricant is not too high (i.e. 150 cSt or less at 40° C.). In contrast, a conventional ester such as di(isotridecyl)adipate which is similar in viscosity to the lubricants of this invention (e.g. di(ethylene oxide neononanoate)adipate) is completely immiscible with R134a. In addition, higher viscosity esters are partially miscible (e.g. di-(ethylene oxide neononanoate)terephthalate, or immiscible (e.g. di(ethylene oxide neononanoate)trimellitate). The esters are also immiscible when m (the number of carbon atoms in $R_4$) exceeds 9.

We claim:

1. A refrigeration working fluid comprising:
   (a) 1,1,1,2-tetrafluoroethane, and
   (b) a synthetic ester lubricant with a viscosity of about 150 cSt or less at 40° C. and having the formula $(R_1-R_2)_n R_3$ wherein $R_1$ is

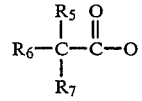

in which $R_5$, $R_6$ and $R_7$ are each independently hydrocarbyl group of from 1 to 7 carbon atoms with the proviso that the sum of carbon atoms in $R_5+R_6+R_7$ is from 7 to 8, $R_2$ is $(CH_2\text{-}CH_2-O-)_b$, where b is an integer from 1 to 3, $R_3$ is a monobasic or polybasic carboxylic acid radical of the formula

where $R_4$ is a hydrocarbyl group having m carbon atoms where m is an integer from 1 to 9, and n is an integer from 1 to 4.

2. The working fluid of claim 1 wherein b is 1.
3. The working fluid of claim 2 wherein n is 1 or 2.
4. The working fluid of claim 3 wherein m is 4 to 6.
5. The working fluid of claim 4 wherein the lubricant comprises di(ethylene oxide neononanoate)adipate.
6. The working fluid of claim 1 wherein the amount of 1,1,1,2,-tetrafluoroethane is from about 95 to about 45 wt. % and the amount of lubricant is from about 5 to about 55 wt. %.

* * * * *